United States Patent [19]

Haruta et al.

[11] Patent Number: 5,589,111
[45] Date of Patent: Dec. 31, 1996

[54] POLYIMIDE PRECURSOR COMPOSITION FOR EXTRUSION MOLDING OF POLYIMIDE, PROCESS FOR PREPARING IT, AND PROCESS FOR PREPARING MOLDED ARTICLES OF POLYIMIDE

[75] Inventors: Hiroshi Haruta; Takehiko Takahashi, both of Chiba, Japan

[73] Assignee: Chisso Corporation, Osaka, Japan

[21] Appl. No.: 439,142

[22] Filed: May 11, 1995

[30] Foreign Application Priority Data

May 13, 1994 [JP] Japan .................................. 6-124150

[51] Int. Cl.$^6$ .............................. B29B 9/10; B29C 47/88
[52] U.S. Cl. ............................ 264/8; 264/169; 264/204; 264/209.6; 264/216; 264/211.24; 264/331.19; 528/183; 528/353
[58] Field of Search .......................... 264/169, 331.19, 264/216, 8, 204, 114, 209.6, 211.24; 528/183, 353

[56] References Cited

U.S. PATENT DOCUMENTS

| | | | |
|---|---|---|---|
| 3,247,165 | 4/1966 | Rodia | 264/216 |
| 3,502,762 | 3/1970 | Haller | 264/204 |
| 4,100,236 | 7/1978 | Gordon et al. | 264/8 |
| 4,473,523 | 9/1984 | Sasaki et al. | 264/204 |
| 4,512,893 | 4/1985 | Makino et al. | 264/209.6 |
| 4,687,611 | 8/1987 | Sroog | 264/204 |
| 4,869,861 | 9/1989 | Inoue et al. | 264/204 |
| 5,290,497 | 3/1994 | Kurita et al. | 264/331.19 |

FOREIGN PATENT DOCUMENTS

| | | | |
|---|---|---|---|
| 63-176141 | 7/1988 | Japan | 264/204 |
| 5-169516 | 7/1993 | Japan | 264/211.21 |
| 5-177689 | 7/1993 | Japan . | |
| 5-338061 | 12/1993 | Japan | 264/331.19 |
| 2070726 | 9/1981 | United Kingdom | 264/204 |

Primary Examiner—Jeffery R. Thurlow
Attorney, Agent, or Firm—Leydig, Voit & Mayer

[57] ABSTRACT

A process for preparing molded articles of a polyimide is provided the steps of melting and extruding, at 50° to 100° C., a polyimide precursor composition for extrusion molding of a polyimide which includes 30 to 60% by weight of a polyimide precursor (c) obtained by reacting an aromatic tetracarboxylic dianhydride or its derivative (a) with an aromatic diamine or its derivative (b) in a good solvent of the polyimide precursor and then depositing the resultant polyimide precursor solution in a poor solvent of the polyimide precursor, 0.1 to 5% by weight of the poor solvent, and 35 to 69.9% by weight of the good solvent, and then heating the molded composition at 250° to 500° C. to imidate the same or its derivative (b) in a good solvent of the polyimide precursor and then depositing the resultant polyimide precursor (c) solution in a poor solvent of the polyimide precursor, 0.1 to 5% by weight of the poor solvent, and 35 to 69.9% by weight of the good solvent, and then heating the molded composition at 250° to 500° C. to imidate the same.

19 Claims, 2 Drawing Sheets

POLYIMIDE PRECURSOR COMPOSITION FOR EXTRUSION MOLDING OF POLYIMIDE, PROCESS FOR PREPARING IT, AND PROCESS FOR PREPARING MOLDED ARTICLES OF POLYIMIDE

BACKGROUND OF THE INVENTION (i) Field of the Invention

The present invention relates to a process for preparing the molded articles of a polyimide. More specifically, it relates to a process for preparing, with a high productivity, the molded articles of a polyimide which are excellent in appearance and physical properties.

(ii) Description of the Related Art

A polyimide resin which is a heat-resistant material having various applications has excellent thermal properties, mechanical properties and electrical properties, and for this reason, the polyimide resin can be utilized as an essential material in various fields. For the polyimide resins, many combinations of monomers to be selected are possible, but if heat resistance is required, an aromatic polyimide is desirable. However, as a technique of molding the aromatic polyimide resin, there have been mainly used a molding method which comprises obtaining the molded articles of a polyimide precursor from the solution of the polyimide precursor while the solution is partially imidated, and then completing the imidation. Another method has also been used which comprises first obtaining a polyimide powder, and then molding the powder at a high temperature under a high pressure. In the former method of molding the articles of the polyimide precursor from the solution of the polyimide precursor, a support is coated with the solution of the polyimide precursor, and the solution is then dried by heating to remove a solvent, while partially imidated. In order to obtain the molded articles having a desired shape, the solution is required to be dried to remove the solvent, while the polyimide precursor solution having a low viscosity is always maintained on the support. When it is intended to obtain the molded articles having a plane shape, various known molding means can be applied, but in the case that the molded articles having shapes other than the plane shape are prepared, the molding means are limited. In fact, as techniques of obtaining the molded articles having the desired shape, there have been suggested the so-called centrifugal molding method using centrifugal force, the so-called immersion method using surface tension and adhesive strength, a spray method and the like. The common drawback of these molding means is that continuous molding is impossible. The centrifugal molding method can scarcely be applied to the molding of the articles having a large width, the tubular articles having a small diameter and the thin articles, and the immersion method and the spray method are scarcely applicable to the molding of the thick articles and the tubular articles having a large diameter. Furthermore, the spray method has additional disadvantages, and for example, the thickness of the articles is not uniform, and foam is present in the molded articles.

For the solution of these conventional technical problems, the present inventors have already suggested a method for preparing the molded articles of a polyimide precursor in Japanese Patent Application Laid-open No. (Hei) 5-177689.

SUMMARY OF THE INVENTION

The present inventors have further investigated with the intention of solving the conventional technical problems, and as a result, the present invention has now been attained.

An object of the present invention is to provide a polyimide precursor composition for extrusion molding of a polyimide which permits obtaining molded articles of a polyimide which are further improved in thickness uniformity and surface smoothness of the molded articles, particularly tubular articles.

Another object of the present invention is to provide a method for preparing the polyimide precursor composition for extrusion molding of a polyimide.

Still another object of the present invention is to provide a method for preparing molded articles of a polyimide.

A polyimide precursor composition for extrusion molding a polyimide of the present invention is directed to the following item (1) or (2).

(1) A polyimide precursor composition for extrusion molding of a polyimide which comprises 30 to 60% by weight of a polyimide precursor (c), 0.1 to 5% by weight of a poor solvent of the polyimide precursor, and 35 to 69.9% by weight of a good solvent of the polyimide precursor.

(2) The polyimide precursor composition for extrusion according to the above-mentioned item (1) wherein the polyimide precursor (c) is obtained by reacting an aromatic tetracarboxylic dianhydride or its derivative (a) with an aromatic diamine or its derivative (b) in a good solvent for the polyimide precursor, and then depositing the resultant polyimide precursor in a poor solvent for the polyimide precursor.

A process for preparing a polyimide precursor composition for extrusion molding of a polyimide of the present invention is directed to the following item (3), (4), (5) or (6).

(3) A process for preparing a polyimide precursor composition for extrusion molding of a polyimide which comprises the steps of placing a poor solvent a polyimide precursor in a mixer equipped with a stirrer having a stirring blade and a disc above the stirring blade, rotating the stirring blade and the disc at a velocity of 100 rpm or more, and then pouring, onto the rotating disc, the polyimide precursor solution obtained by reacting (a) an aromatic tetracarboxylic dianhydride or its derivative with (b) an aromatic diamine or its derivative in a good solvent for the polyimide precursor, whereby the polyimide precursor solution is dispersed in the poor solvent by the centrifugal force of the disc to deposit (c) the polyimide precursor.

(4) The process for preparing a polyimide precursor composition for extrusion according to the above-mentioned item (3) wherein a deposit obtained by dispersing the polyimide precursor solution in the poor solvent is dried at 0° to 100° C. to regulate the good solvent content, thereby obtaining the composition comprising 30 to 60% by weight of the polyimide precursor (c), 0.1 to 5% by weight of the poor solvent and 35 to 69.9% by weight of the good solvent.

(5) The process for preparing a polyimide precursor composition for extrusion according to the above-mentioned item (3) wherein the good solvent is a solvent containing 30% by weight or more of a component having a boiling point of 170° C. or more.

(6) The process for preparing a polyimide precursor composition for extrusion according to the above-mentioned item (3) wherein in the reaction of the aromatic tetracarboxylic dianhydride or its derivative (a) with the aromatic diamine or its derivative (b) in the good solvent of the polyimide precursor, the concentration of a mixture of the components (a) and (b) is in the range of 10 to 20% by weight.

A process for preparing molded articles of a polyimide of the present invention is directed to the following item (7), (8), (9), (10), (11), (12) or (13).

(7) A process for preparing the molded articles of a polyimide which comprises the steps of melting and extruding, at 50° to 100° C., a polyimide precursor composition for extrusion molding of a polyimide comprising 30 to 60 by weight of (c) a polyimide precursor obtained by reacting (a) an aromatic tetracarboxylic dianhydride or its derivative with (b) an aromatic diamine or its derivative in a good solvent of the polyimide precursor and then depositing the resultant polyimide precursor in a poor solvent for the polyimide precursor, 0.1 to 5% by weight of the poor solvent, and 35 to 69.9% by weight of a good solvent, and then heating the molded composition at 250° to 500° C. to imidate the same.

(8) The process for preparing molded articles of a polyimide according to the above-mentioned item (7) which comprises melting a polyimide precursor composition for extrusion at 50° to 100° C., extruding the molten composition so as to coat a successively fed core member therewith, heating the composition at 250° to 500° C. to imidate it, and then removing the core member to obtain a tubularly molded article of the polyimide.

(9) The process for preparing molded articles of a polyimide according to the above-mentioned item (7) wherein the good solvent is a solvent containing 30% by weight or more of a component having a boiling point of 170° C. or more.

(10) The process for preparing molded articles of a polyimide according to the above-mentioned item (7) wherein in the reaction of the aromatic tetracarboxylic dianhydride or its derivative (a) with the aromatic diamine or its derivative (b) in the good solvent for the polyimide precursor, the concentration of a mixture of the components (a) and (b) is in the range of 10 to 20% by weight.

(11) The process for preparing molded articles of a polyimide according to the above-mentioned item (7) or item (8) wherein the melt index of the polyimide precursor composition for extrusion is in the range of 10 to 300 (g/10 min).

(12) The process for preparing molded articles of a polyimide according to the above-mentioned item (7) or item (8) wherein the extrusion is carried out by the use of a die coated to a land with a substance whose contact angle is 120° or less and which has a wet tension of 20 dyne/cm or less.

(13) The process for preparing molded articles of a polyimide according to the above-mentioned item (7) or item (8) wherein the polyimide precursor composition for extrusion is molten at 50° to 100° C., and then filtered through a screen pack having 300 mesh or more.

In the process for preparing the polyimide composition for extrusion, preferable conditions are that a deposit is separated by a filter medium having a contact angle of 120° or less and a wet tension of 20 dyne/cm or less, and then dried, that the concentration of the composition is regulated prior to granulation, that synthesis, deposition, separation and drying are carried out at 0° to 100° C., and that the concentration of the dried deposit is regulated, granulated into pellets, and then stored at −10° to 10° C.

EXPLANATION OF SYMBOLS

8 . . . Injection orifice for feeding a polyimide precursor solution
9 . . . Motor
10 . . . Rotary axis
11 . . . Mixer
12 . . . Stirring blade
13 . . . Disc
14 . . . Polyimide precursor solution
15 . . . Pressure container
16 . . . Discharge orifice
17 . . . Poor solvent
18 . . . Poor solvent surface
19 . . . Molten composition
20 . . . Core member
21 . . . Melt inlet
22 . . . Spiral flow path
23 . . . Choke (constriction)
24 . . . Manifold (pool)
25 . . . Gap (die outlet space)
26 . . . Land (parallel straight line portion of the die outlet space)
27 . . . Melting sleeve (cylindrical melt extruded through a round die)
28 . . . Thickness regulating ring
29 . . . Pressure reducing mechanism
30 . . . Rubber ring
31 . . . Mandrel

DETAILED DESCRIPTION OF THE INVENTION

A polyimide precursor (c) which can be used in the present invention can be obtained by reacting an aromatic tetracarboxylic dianhydride or its derivative (a) with an aromatic diamine or its derivative (b) in a good solvent, as shown by the following reaction formula:

wherein each of $R^1$ and $R^2$ is an aromatic group, and n is the number of repeating units to produce a viscosity of 30 to 400 Pascal·sec (Pa·s; a value measured by a rotary viscometer at 25° C. in 15 wt % dimethylacetamide solution).

Typical examples of the aromatic tetracarboxylic dianhydride and its derivative (a) include pyromellitic dianhydride, 3,3',4,4'-benzophenonetetracarboxylic dianhydride, 3,3',4,4'-biphenyltetracarboxylic dianhydride, 2,3,3',4'-biphenyltetracarboxylic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 2,2'-bis(3,4-dicarboxyphenyl)propane dianhydride, bis(3,4-dicarboxyphenyl)sulfone dianhydride and their derivatives. They can be used singly or as a mixture of two or more thereof.

Typical examples of the aromatic diamine and its derivative (b) include 4,4'-diaminophenyl ether, 4,4'-diaminodiphenylmethane, 3,3'-diaminodiphenylmethane, paraphenylenediamine, metaphenylenediamine, benzidine, 3,3'-dimethylbenzidine, 3,3'-dimethoxybenzidine, 4,4'-diaminodiphenylsulfone, 4,4'-diaminodiphenyl sulfide, 4,4'-diaminodiphenylpropane, 2,2'-bis[4-(4-aminophenoxy)phenyl]propane and their derivatives. They can be used singly or as a mixture of two or more thereof.

The good solvent which can be used in the present invention is a solvent in which the polyimide precursor (c) has a high solubility. Typical examples of the good solvent include N-methyl-2-pyrrolidone, dimethylacetamide, dimethylformamide, dimethyl sulfoxide and hexamethylenephosphortriamide, and they can be used singly or as a mixture of two or more thereof. The good solvent can be mixed with a phenol such as cresol, phenol or xylenol, hexane, benzene or toluene. In particular, the solvent preferably has a boiling point of 170° C. or more (760 mmHg) to 300° C. or less, more preferably 190° to 220° C. If the content of the good solvent having a boiling point of 170° C. or more (760 mmHg) to 300° C. or less is 30% by weight or more of the total good solvent, cracks scarcely take place in a drying imidation step, so that the quality of molded articles is stable, which is desirable. The ratio of the solvent having a boiling point of 170° C. or more may be 100% by weight of the good solvent. If the good solvent having a boiling point of less than 170° C. is used, the drying step can be easily carried out, however, cracks occur while the solvent is heated and then evaporated in the drying imidation step. It can be considered that when the sum of strength generated as a result of the imidation and affinity between a solute and the solvent is larger than stress due to volume shrinkage and the like generated at the time of the evaporation of the solvent, no cracks take place, but when the sum is smaller, the cracks occur. It can also be considered that when the solvent evaporates before the strength necessary for the shape maintenance of the molded articles has been created by the imidation reaction, the cracks easily take place.

The synthesis of the polyimide precursor (c) can be carried out by reacting the aromatic tetracarboxylic dianhydride or its derivative (a) with the aromatic diamine or its derivative (b) in the good solvent. In this reaction, the concentration of an equimolar mixture of the aromatic tetracarboxylic dianhydride or its derivative (a) and the aromatic diamine or its derivative (b) is preferably in the range of 10 to 20% by weight, more preferably 11 to 14% by weight, and the reaction temperature is 80° C. or less, preferably in the range of 5° to 50° C. and the reaction time is in the range of 2 to 10 hours. Under such reaction conditions, the reaction can be carried out in a uniform system, thereby obtaining a polyimide precursor solution having a viscosity and a fluidity suitable to obtain a deposit when it is poured and dispersed into the poor solvent.

The poor solvent which can be used in the present invention is a solvent in which the polyimide precursor (c) has a low solubility. Typical examples of the poor solvent include ethanol, methanol, acetone, benzene, toluene, xylene, ethyl acetate and water, and they can be used singly or as a mixture of two or more thereof. Preferably, this poor solvent has a good compatibility with the good solvent. The amount of the poor solvent for the deposition is suitably in the range of 1 to 15 times by weight as much as that of the polyimide precursor solution. The poor solvent may be used in an amount in excess of this range, but such a way is not economical.

A process for preparing a polyimide precursor composition for extrusion molding of a polyimide regarding the present invention includes the steps of placing a poor solvent for a polyimide precursor in a mixer equipped with a stirrer having a stirring blade and a disc above the stirring blade, rotating the stirring blade and the disc at a velocity of 100 rpm or more, and then pouring, onto the rotating disc, the polyimide precursor solution obtained by reacting an aromatic tetracarboxylic dianhydride or its derivative (a) with an aromatic diamine or its derivative (b) in the good solvent for the polyimide precursor, whereby the polyimide precursor solvent is dispersed in the poor solvent to deposit the polyimide precursor (c). The obtained deposit includes the good and poor solvent with the polyimide precursor (c).

Figure 1A:
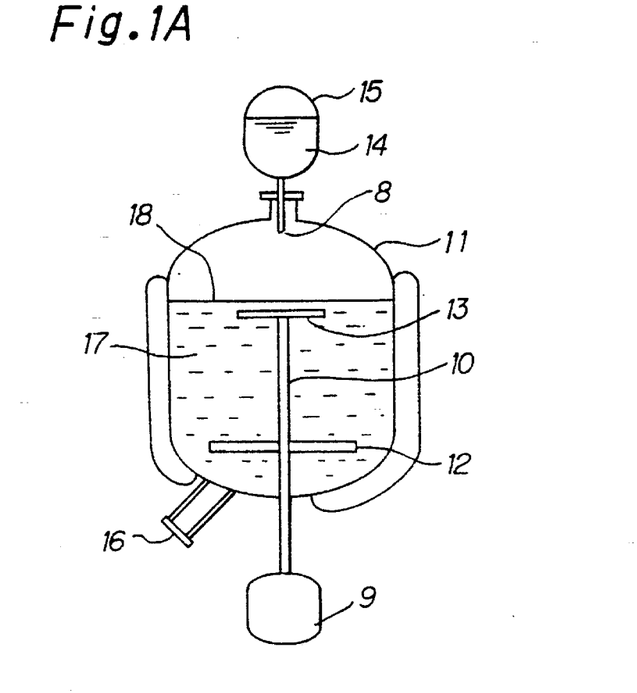
FIG. 1A is a schematic view of a device which can be used to prepare a polyimide precursor composition for extrusion molding of a polyimide in which the stirrer is not rotated.
Figure 1B:
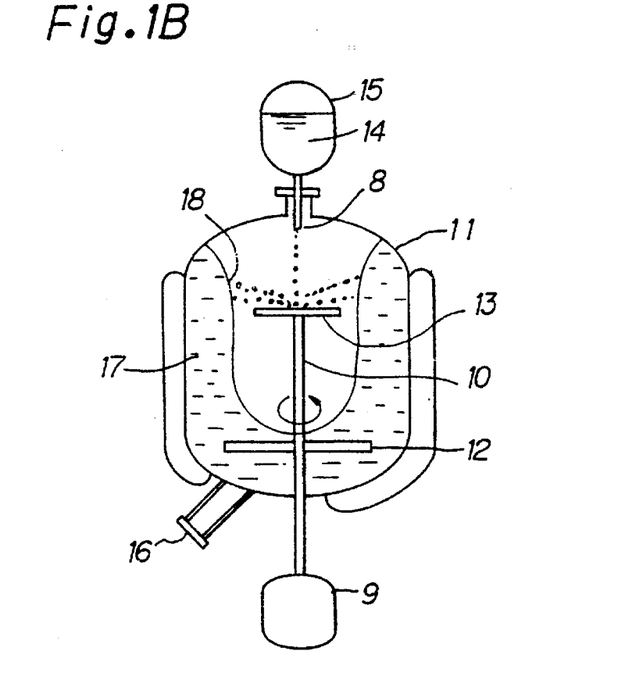
FIG. 1B is a schematic view of a device which can be used to prepare a polyimide precursor composition for extrusion molding of a polyimide in which the stirrer is rotated.

This preparation process will be described on the basis of a polyimide precursor depositing device shown in FIG. 1.

This device is made by remodeling a Henschel mixer (trade name). In the device, a stirring axis or axle 10 of a mixer 11 is provided with a stirring blade 12 and a disc 13 above the stirring blade 12, and the stirring axis 10 is connected to a motor 9 rotating at a high velocity of 100 rpm or more.

A pressure container 15 for feeding the above-mentioned polyimide precursor solution 14 is arranged above the disc 13, and the mixer 11 is provided with a discharge orifice 16 through which the deposited polyimide precursor is taken out. The material of the stirring blade 12 is preferably a substance to which the polyimide precursor scarcely adheres, and as such a material, polyolefins (PP, PE and the like), a polyester resin (such as polyethylene terephtalate, PET) and a fluororesin are better than metals from the viewpoint of dispersibility. The size of the disc 13 is preferably in the range of 30 to 50% of the inner diameter of the mixer 11. If the size of the disc 13 is too large, the deposit is formed on the disc and gradually accumulated to form a large mass, and if it is too small, the centrifugal force of the disc is weak, so that the dispersibility is poor. In order to uniformly feed the polyimide precursor solution 14 in a short period of time, it is preferable that pressurized air is applied to the pressure container 15 having an injection orifice 8 with a diameter of 5 mm or less.

The way of dispersing and depositing the polyimide precursor solution in the poor solvent is carried out by placing a predetermined amount of the poor solvent 17 in the mixer 11, and then rotating the stirring blade 12 and the disc 13 at a high velocity of 100 rpm or more. In this case, when not rotated, the disc 13 may be sunk in the poor solvent (see FIG. 1A), but when it is rotated at the high velocity, the surface of the poor solvent 18 is preferably at lower level than the upper surface of the disc 13 (see FIG. 1B). Therefore, the amount of the poor solvent is required to be decided so as to meet such conditions.

High-speed solvent layers of the poor solvent 17 are formed on the stirring blade 12 and the inner wall of the container 11, and the polyimide precursor solution 14 is poured in a thin flow state onto the disc 13 and dispersed into the poor solvent 17 by the centrifugal force of the disc. The rotational frequency of the disc is preferably in the range of 500 to 1500 rpm, and the polyimide precursor solution 14 is poured in the form of a thin flow having a diameter of 5 mm or less, preferably in the range of 2 to 4 mm, more preferably a diameter of less than this range. A deposition temperature is preferably 100° C. or less, and more preferably in the range of 10° to 30° C. Such conditions permit the easy and efficient production of a short fiber-like flaky or powdery deposit having a uniform shape.

Next, the deposit is separated from the solution, and then dried at 0° to 100° C. to prepare the composition of present invention. The good solvent may be added to the dried deposit to adjust its concentration in the composition.

As a filtering medium which can be used to separate the deposit from the solution, there can be used a filter paper, a filter cloth, a net or a filter. This filtering medium preferably has a contact angle of 120° or less and a wet tension of 20 dyne/cm or less, and a net made of monofilaments is preferable. Examples of the material of the monofilaments include polytetrafluoroethylene (PTFE), tetrafluoroethylene-perfluoroalkyl vinyl ether copolymer (PFA), tetrafluoroethylene-hexafluoropropylene copolymer (fluorinatedethylene, FEP) and tetrafluoroethylene-ethylene copolymer (ETFE). In the case that the separation is carried out by filtration through such a filtering medium, clogging scarcely occurs, and the deposit can easily be removed and scarcely adheres to the filtering medium. In addition, this kind of filtering medium can be repeatedly used.

The separation is preferably carried out by placing the solution containing the deposit in a bag made of the above-mentioned filtering medium, and then subjecting the same to centrifugal filtration.

The separated deposit is dried or vacuum-dried in a dry air or inert gas at 0° to 100° C., preferably 40° to 70° C., whereby the amount of the water-containing poor solvent in the deposit can be decreased. If the drying temperature is in excess of 100° C., many insoluble hard spots of the polyimide precursor undesirably at the time of extrusion molding.

The dried deposit may be directly extruded, or alternatively, the good solvent is added to the dried deposit to regulate the concentration of the good solvent in the dried deposit, and the resultant mixture may be granulated and then extruded. The granulation can be carried out by adding the good solvent to the dried deposit, uniformly mixing them with rollers, a kneader or a mixer, molding the mixture under pressure, and then cutting the molded sheet into rectangular pellets having a side of 1 to 10 mm. When such rectangular pellets are used, the extrusion can be efficiently done with less blocking to obtain more uniform articles. If the material is stored at ordinary temperature, preferably in a low-temperature and low-humidity container at −10° to 10° C. until the extrusion, the composition scarcely brings about blocking and scarcely absorbs moisture.

In the composition for extrusion molding of a polyimide of the present invention, the concentration of the polyimide precursor (c) is in the range of 30 to 50% by weight, preferably 35 to 45% by weight. If the concentration of the polyimide precursor (c) is less than 30% by weight or more than 50% by weight, the composition having a proper viscosity and fluidity cannot be obtained at the time of the extrusion.

The amount of the poor solvent in the composition for extrusion of the present invention is in the range of 0.1 or more to 5% or less by weight, preferably 2% by weight or less, more preferably less than this value, but it is difficult and uneconomical to completely remove the poor solvent. In particular, when the hygroscopic good solvent and the moisture of the poor solvent are removed, the formation of microbubbles, film breakage and bad appearance of the extruded material can be reduced.

The melt index (a fluidity index; measured at 100° C. under a load of 2 kg through a die having a diameter of 2.095 mm and a length 8 mm in accordance with the test method of JIS-K7210; unit=g/10 min) of the polyimide precursor composition for extrusion molding which is suitable to obtain the molded articles of the polyimide of the present invention is preferably in the range of 10 to 300, more preferably 50 to 200, more preferably 80 to 150. Thus, the amount of the good solvent which is included in the composition is adjusted so that its melt index may be within the above-mentioned range. If this range is met, the self-shape retention of the molded articles at the time of the extrusion is good, and the generation of shear heat in an extruder is inhibited. In consequence, the formation of the hard spots with time can be prevented, so that the continuous extrusion can be stably achieved for a long time. In the thus extruded articles, the moldability of a set shape is good, and the formation of rough surfaces by bad fluidity can be prevented. In addition, an appearance failure such as smoothness failure by the unevenness of the extrusion can be inhibited, and the hard spots are scarcely generated. Thus, the extruded articles are uniform and homogeneous, and they are excellent in breaking strength, breaking extension and modulus of elasticity. The above-mentioned self-shape retention means a viscoelastic state in which the molded articles do not exert any gravity fluidity at ordinary temperature on a vertical support.

For the extrusion in the process for preparing the articles of the polyimide according to the present invention, there can be used a general-purpose monoaxial or biaxial and a quick compression type or a slow compression type extruder for resins which may be equipped with screws rotatable in one direction or mutually reverse directions if it is biaxial and which may have a vent or no vent, have an orifice or no orifice and have a gear pump or no gear pump. In addition, a mechanism is desirable in which the low-temperature extrusion can be accurately regulated, dead zones in the extruder can be decreased to smoothly deliver the molten composition, and the generation of the shear heat can be inhibited. Concretely, it is desirable that an extrusion temperature is adjusted to 100° C. or less, preferably 60° to 80° C.; a compression ratio (an effective sectional area ratio of a feed section/a metering section) is in the range of 1.2 to 3; the biaxial extruder equipped with mutually reversely rotatable screws and the vent is used together with the gear pump; and filtration is carried out by the use of a fixed type or a continuous type fine screen pack of 300 to 500 mesh. Under these conditions, the formation of the hard spots with time can be remarkably prevented, so that extruded articles which are uniform and homogeneous can be obtained.

No particular restriction is put on the molding method, and any one of film blowing, sheet blowing, contour extrusion, coating, fiberfil molding, hollow casting and injection molding can be used.

Figure 2:
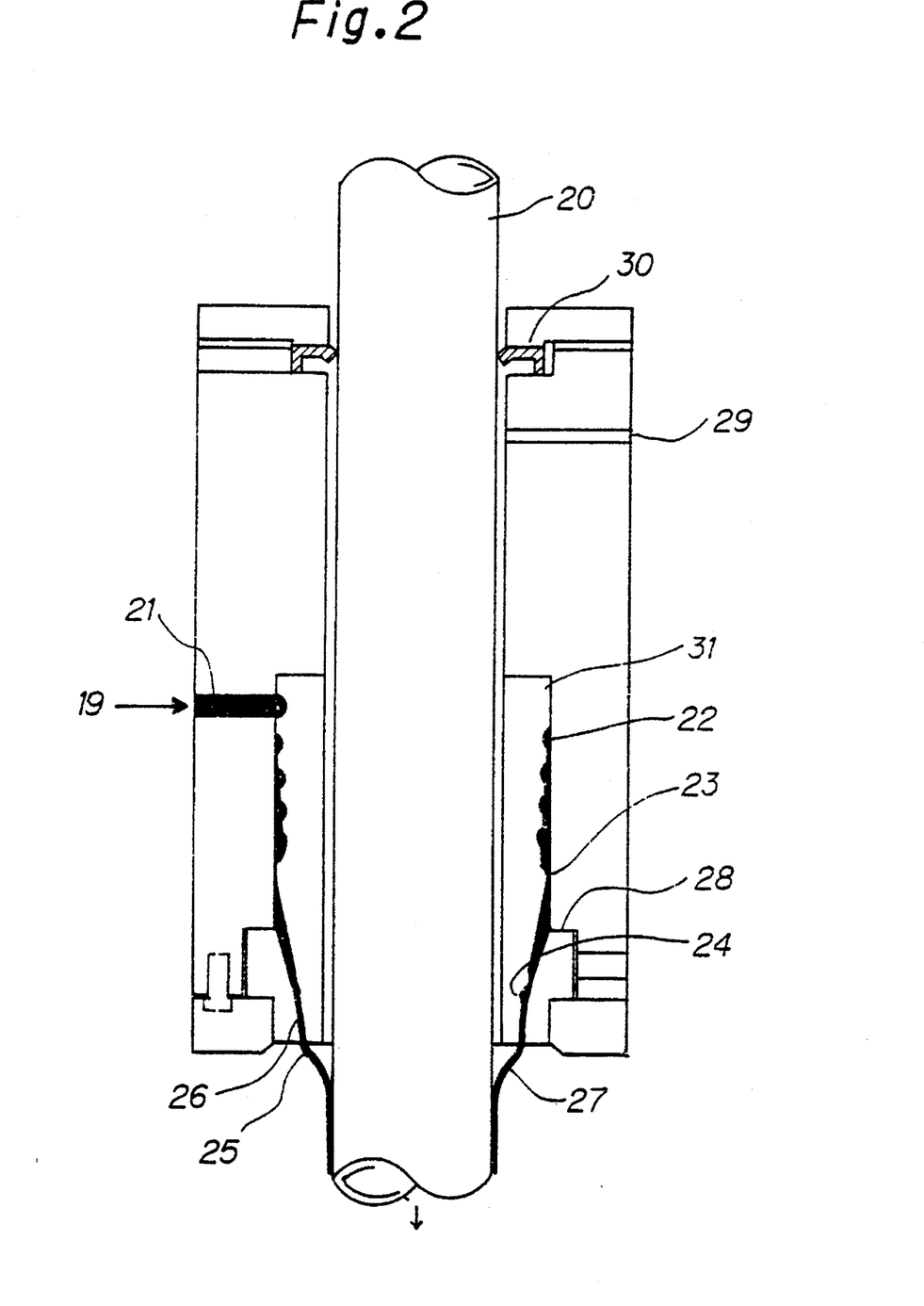
FIG. 2 is a schematic view of a coating die for a device which can be used to prepare the tubular articles of the polyimide.

In the case that tubular articles are prepared by the preparation process of the molded articles of the polyimide according to the present invention, an apparatus can be used which comprises an extruder for melting and determining the composition for the extrusion molding, a moving device for successively delivering a core member 20, and a coating die for coating the core member with a molten coating material.

The coating die will be described with reference to FIG. 2.

Reference numeral 20 is the core member which can move downward as shown in the drawing, numeral 21 is a melt inlet, 22 is a spiral flow path, 23 is a choke (constriction), 24 is a manifold (pool), 28 is a thickness regulating ring, 25 is a gap (a die outlet space), and 26 is a land (a parallel straight line of the die outlet space) portion. The inner wall surface and the peripheral surface of the land (the parallel straight line portion of the die outlet space) are coated with polytetrafluoroethylene (PTFE) having a contact angle of 120° or less and a wet tension of 20 dyne/cm or less. A rubber ring 30 and a pressure reducing mechanism for reducing the pressure between the core member 20 and a sleeve (a composition melt extruded through a die) 27 are arranged on the die.

The core member moving device (not shown) has two pairs of rolls for feeding the core member onto this pressure reducing mechanism at a constant velocity, two pairs of rolls for successively feeding the upper portion of the core member without discontinuation, and a removal mechanism for holding and removing the coated core member from the lower portion of the die at a constant velocity. Thus, the core member 20 can be successively delivered by these members.

The extruder for melting and determining the polyimide precursor composition for the extrusion can be provided with the screen pack of 300 to 500 mesh, and in this case, the formation of the hard spots can be inhibited, so that the smooth articles can be conveniently obtained. If the screen pack is coarse, the hard spots cannot be eliminated, and if the screen pack is fine, extrusion back pressure increases.

Examples of the substance having a contact angle of 120° or less and a wet tension of 20 dyne/cm or less with which the inner wall surface and the peripheral surface of the land (the parallel straight line portion of the die outlet space) 26 are coated include polytetrafluoroethylene (PTFE), tetrafluoroethylene-perfluoroalkyl vinyl ether copolymer (PFA), tetrafluoroethylene-hexafluoropropylene copolymer (FEP) and tetrafluoroethylene-ethylene copolymer (ETFE). When the coating is given with the substance having a contact angle of 120° or less and a wet tension of 20 dyne/cm or less, no scale is attached and longitudinal stripes do not appear on the surfaces of the extruded articles, so that a good surface appearance can be obtained.

If a die land/gap is in the range of 10 to 100, a rectification function is exerted, so that a thickness deviation is ±20% or less and no melt fracture takes place. In consequence, the good surface appearance can be obtained.

The pressure reducing mechanism for reducing the pressure between the core member 20 and the sleeve 27 can be provided, whereby any bulge does not come out, so that the molded articles having smooth and uniform surfaces can be obtained.

As extrusion conditions, an extrusion temperature is 100° C. or less, preferably in the range of 60° to 80° C., and under such conditions, the generation of hard spots with time can be decreased. The decrease of hard spots inhibits the rise of the extrusion back pressure, so that stable extrusion can be carried out for a long period of time and molded articles having the good appearance can be obtained. The insoluble hard spots of the polyimide precursor can be considered to be the supersaturated deposit of the polyimide precursor from the good solvent, but they can be presumed to be the lowly imidated polyimide precursor separated from the good solvent. The hard spots cause clarity loss, voids, film breakage, rough surfaces, clogging of the screen pack, generation of screw rotation resistance and the like. Thus, they are the largest trouble factor for disturbing the continuous preparation of the uniform and homogeneous articles.

The wall thickness and the outer diameter of the extruded articles can be set in compliance with requirements.

The imidation in the process for preparing the molded articles according to the present invention can be carried out by subjecting the extruded articles to a heat treatment at from ordinary temperature to 250°–500° C. over 0.5 to 3 hours to remove the good solvent and to bring about the dehydration reaction of the polyimide precursor. If the temperature of the imidation is too low, too much time is taken for the dehydration reaction, and sufficiently effective heat resistance and strength cannot be obtained. If it is too high, decomposition begins, so that the reaction material becomes brown, and foaming and cracks take place owing to the rapid evaporation of the solvent. Preferably, the imidation should be carried out by elevating the temperature of the molded articles from ordinary temperature to 300°–450° C. over 0.8 to 2 hours. After the imidation, the core member is removed, thereby obtaining the molded articles of the polyimide.

The cracks take place in the course of drying imidation of the molded articles of the polyimide precursor, and in the case that the solvent is removed by the drying at a step in which imidation reaction does not proceed, the cracks easily occur.

The polyimide precursor composition for extrusion molding of the polyimide of the present invention is not a thermoplastic resin, but by the use of a conventional extruder for general-purpose thermoplastic resins, the polyimide can be easily molded.

In addition, according to the present invention, the process for preparing the polyimide precursor composition for extrusion molding of polyimide and the deposit of the polyimide precursor suitable for the molding can be provided.

According to the process for preparing the molded articles of the present invention, the polyimide precursor composition of the present invention and specific conditions can be used, so the stable and continuous preparation is possible without any generation of foaming and film breakage, and productivity is also good. In addition, there can be provided molded articles, particularly cylindrical articles having a good appearance free from cracks, rough surfaces, hard spots, wavy wrinkles, longitudinal stripes, bulges, clarity loss and whiting, and having excellent physical properties such as strength, extension and modulus of elasticity.

The present invention will be described in more detail with reference to examples and comparative examples.

With regard to the evaluation of the shape of a deposit, a deposit having no large mass was represented by o and deposit having large mass was represented by x.

The concentration of the polyimide precursor can be calculated in accordance with the following formula:

$$\text{(the weight of the polyimide precursor after a heat treatment at } 425°\text{ C./k)/(the weight of the composition for extrusion)} \times 100$$

wherein k is the theoretical molecular weight of the polyimide/the theoretical molecular weight of the polyimide precursor (c).

Each of a good solvent and a poor solvent was calculated from each corresponding peak area ratio by a high-temperature gas chromatography (100° to 200° C.).

An MI (100° C., load of 2 kg) is an index of the extrusion fluidity of the polyimide precursor solid, and it is a value obtained by regarding a test temperature of test conditions 2 as 100° C. in accordance with JIS k-7210.

With regard to extrusion molding properties, a case where a stable continuous preparation can be carried out without any clogging of a screen pack, screw rotation resistance and the like, and productivity was also Good was represented by o, and a case where the preparation could not be carried out in such a good manner was represented by x.

With regard to appearance, the molded articles which were free from cracks, rough surfaces, hard spots, wavy wrinkles, longitudinal stripes, bulges, clarity loss and whiting were represented by o, and the molded articles which were not so were represented by x.

Surface smoothness (surface roughness) was measured in accordance with a contact needle type surface roughness measuring method of JIS B-0651 (T1000C made by German Hommelwerke was used; unit=μm).

EXAMPLE 1

(Preparation of a polyimide precursor solution)

First, 12 parts by weight of an equimolar mixture of 3,3',4,4'-biphenyltetracarboxylic dianhydride represented by the formula (2)

and a paraphenylenediamine represented by the formula (3)

was mixed with 88 parts by weight of N-methyl-2-pyrrolidone (abbreviated to NMP; boiling point=204° C.) which was a good solvent, and the mixture was then stirred at 10° C. for 8 hours to carry out reaction, thereby obtaining a polyimide precursor solution (hereinafter referred to as "PAA solution") having a solution viscosity of 170 Pascal·sec (Pa·s; a value measured by a rotary viscometer at 25° C.).

(Preparation of a polyimide precursor composition for extrusion)

A 20-liter Henschel mixer was remodeled to make a mixer 11, and the upper portion of the mixer 11 was provided with a pressure container 15. The upper portion of a stirring axis or axle 10 was equipped with a polypropylene disc 13 having a diameter of 130 mm (about 43% of the inner diameter of the device) and a thickness of 5 mm, and the lower portion of the stirring axis 10 was equipped with a stirring blade 12 (see FIG. 1).

Next, 6.9 kg of ethanol was placed in this mixer 11, and then stirred at a rotational speed of 950 rpm. Afterward, 1.8 kg of the above-mentioned PAA solution 14 was placed in a pressure container 15 and then poured as a thin flow under pressure onto a rotating polypropylene disc 13 through an injection orifice 8 having a diameter of 3 mm. After the pouring, the mixture was continuously stirred at 20° C. for 30 minutes to deposit the polyimide precursor. The obtained deposit was in the form of short fiber-like flakes having a substantially uniform shape.

The solution containing the deposit was placed in a filtering bag made of monofilaments of a fluororesin, and the deposit was then separated at a rotational frequency of 3000 rpm by the use of a centrifugal separator. The deposit could be easily removed, and the amount of the deposit attached to the filtering bag was so small that the filtering bag could be repeatedly used. In order to reduce the amount of poor solvents such as ethanol and water in the deposit separated by the filtration, 600 g of the deposit separated by the filtration was placed in a sealed drier equipped with a biaxial stirring blade, and a drying temperature was stepwise raised from 40° C. to 60° C. and the deposit was then dried for 40 minutes in a nitrogen gas. As a result, 330 g of the dried deposit was obtained. The dried deposit had a composition substantially comprising 65% by weight of the polyimide precursor, 33% by weight of a good solvent NMP and 2% by weight of the poor solvent. Next, 210 g of NMP was uniformly added to the dried deposit, and the mixture was then molded into a sheet having a thickness of 2 mm by the use of press rolls whose temperature was adjusted to 10° C. Furthermore, a machine for manufacturing rectangular pellets was used to obtain a desired composition in the form of rectangular pellets. This composition having the form of the pellets substantially comprised 40% of the polyimide precursor, 59% of the good solvent and 1% by weight of an extraction solvent and the poor solvent, and its MI was 90. After the extraction step, operations were carried out in a moisture-proof dust-proof circumstance. The composition was stored at a temperature of 10° C. or less.

(Preparation of molded articles of polyimide)

An an extruder, a slow compression type biaxial extruder equipped with mutually reversely rotatable screws of 20 mm in diameter and a vent and having a compression ratio of 2 was used together with a gear pump, and a fixed screen pack of 500 mesh was further used.

A coating die is shown in FIG. 2. A cloth head round die having an orifice of 46 mm in diameter was attached to the tip of the gear pump, and this round die was constituted of a spiral flow path, a manifold (pool), a choke (constriction) and a thickness regulating ring. A gap and a land were set to 0.5 mm and 35 mm, respectively, and the inner wall surface and the peripheral surface of the land portion were coated with polytetrafluoroethylene (30μ).

A metal tube 20 having an outer diameter of 45 mm was passed through the round die (coating die), and on the other had, the above-mentioned pellets as the composition stored at 10° C. were thrown into the extruder. The composition was molten and extruded, and then introduced into a melt inlet 21 by the gear pump. The molten composition was passed through a spiral flow path 22, a choke 23 and a land 26, and it was then shaped into a molten sleeve 27 in a gap 25 so as to cover the metal tube (core member) 20 successively delivered. With regard to extrusion conditions, a temperature was 80° C., an extrusion rate was 1 kg/hr, a metal tube delivery speed was 1.5 m/min, and a pressure between the metal tube (core member) 20 and the molten sleeve 27 was 500 mmAq.

Extrusion was continuously carried out for 8 hours, and in this case, there did not occur foaming, film breakage, clarity loss, voids, rough surfaces, longitudinal stripes, hard spots, wavy wrinkles, bulges, clogging of the screen pack, screw rotation resistance and the like. Thus, stable continuous preparation could be achieved, and productivity was also high.

Next, molded articles with which the metal tubes were coated were imidated by raising an imidation temperature from ordinary temperature to 425° C. over 2 hours. Afterward, the molded articles were removed from the metal tubes to obtain cylindrically extruded polyimide articles having a thickness of 20 μm.

The thus extruded article of the polyimide had the physical properties of a breaking strength of 31.2 kg/mm², a breaking extension of 18.8%, a modulus of elasticity of 708 kg/mm$^2$, a thickness deviation of ±11% and a surface smoothness Rz of 1.0 μm. The appearance of the extruded article was good, and it was free from cracks, rough surfaces, hard spots, wavy wrinkles, longitudinal stripes, bulges, clarity loss and whiting.

Comparative Example 1

First, 15 parts by weight of an equimolar mixture of 3,3',4,4'-biphenyltetracarboxylic dianhydride and a paraphenylenediamine was mixed with 85 parts by weight of N,N-dimethylacetamide (abbreviated to DMAC; boiling point=165.5° C. at 758 mmHg) which was a good solvent, and the mixture was then stirred at 10° C. for 8 hours to carry out synthesis, thereby obtaining a polyimide precursor solution having a solution viscosity of 80 Pascal·sec (Pa·s; a value measured by a rotary viscometer at 25° C.). Next, 36 parts by weight of ethanol which was a poor solvent was placed in a Henschel mixer, and 10 parts by weight of the above-mentioned polyimide precursor solution was poured into the ethanol with stirring. After the pouring, the mixture was continuously stirred at 30° C. for 30 minutes, and the solution containing the resultant deposit was subjected to centrifugal separation to remove the solution, thereby separating the deposit. This deposit was dried at 40° C. for 40 minutes under reduced pressure in a nitrogen gas to obtain the dried deposit. The composition of this dried deposit substantially comprised 55% of the polyimide precursor, 38% of the good solvent DMAC and 7% by weight of the poor solvent.

As an extruder, the same extruder as in Example 1 was used. A crosshead round die having an orifice of 46 mm in diameter was attached to the extruder, and its round die was constituted of a spiral flow path, a manifold (pool), a choke (constriction) and a thickness regulating ring. A gap and a land were set to 0.5 mm and 35 mm, respectively, and the above-mentioned composition was thrown into the extruder. An extrusion temperature was 110° C., an extruder output was 1 kg/hr, and a metal tube velocity was 1.5 m/min. Continuous extrusion molding was carried out for 8 hours. In the thus molded articles, there were noticeably observed foaming, film breakage, longitudinal stripes, clarity loss, voids, rough surfaces, wavy wrinkles, bulges by air traps and hard spots.

Next, the drying imidation of the molded articles with which the metal tubes were coated was carried out by raising an imidation temperature from ordinary temperature to 400° C. over 2 hours. Afterward, the molded articles were removed from the metal tubes to obtain extruded polyimide articles having a thickness of 20 μm. The thus extruded articles of the polyimide had the physical properties of a breaking strength of 18 kg/mm$^2$, a breaking extension of 7%, a modulus of elasticity of 450 kg/mm$^2$, a thickness deviation of ±60 and a surface smoothness Rz of 25 μm. The appearance of the extruded articles was bad, and they had foaming, stripes, clarity loss, voids, rough surfaces, wavy wrinkles and hard spots.

TABLE 1

|  | Example 1 | Comp. Ex. 1 |
| --- | --- | --- |
| Shape of Deposit | o | x |
| Composition (wt %) |  |  |
| Precursor | 40 | 55 |
| Good Solvent | 59 | 38 |
| Poor Solvent | 1 | 7 |
| Melt Index (g/10 min) | 90 | 5 |
| Extrusion Properties | o | x |
| Molded Articles of Polyimide |  |  |
| Appearance | o | x |
| Surface Roughness (μm) | 1.0 | 25 |
| Thickness Deviation ± % | 11 | 60 |
| Strength (kg/mm$^2$) | 31.2 | 18 |
| Ductility (%) | 18.8 | 7 |
| Elasticity (kg/mm$^2$) | 708 | 450 |

What is claimed is:

1. A polyimide precursor composition for extrusion molding of a polyimide which comprises 30 to 45% by weight of a polyimide precursor, 0.1 to 5% by weight of a poor solvent having a low solubility for the polyimide precursor, and 35 to 69.9% by weight of a good solvent having a high solubility for the polyimide precursor.

2. The polyimide precursor composition for extrusion according to claim 1 wherein the polyimide precursor is obtained by reacting (a) an aromatic tetracarboxylic dianhydride or its derivative with (b) an aromatic diamine or its derivative in the good solvent for the polyimide precursor, and then depositing the resultant polyimide precursor in a poor solvent for the polyimide precursor.

3. A process for preparing a polyimide precursor composition for extrusion molding of a polyimide which comprises the steps of placing a poor solvent having a low solubility for a polyimide precursor in a mixer equipped with a stirrer having a stirring blade and a disc above the stirring blade, forming high-speed solvent layers of the poor solvent on the stirring blade and an inner wall of the mixer by rotating the stirring blade and the disc at a velocity of 100 rpm or more such that the upper surface of the disc, which is below the surface of the poor solvent when the disc is at rest, is above the level of the solvent when rotated at high speed, and then pouring in a thin flow state, onto the rotating disc, the polyimide precursor solution obtained by reacting (a) an aromatic tetracarboxylic dianhydride or its derivative with (b) an aromatic diamine or its derivative in a good solvent having a high solubility for the polyimide precursor, whereby the polyimide precursor solution is dispersed in the high speed solvent layers of the poor solvent by the centrifugal force of the disc to deposit (c) the polyimide precursor.

4. The process for preparing a polyimide precursor composition for extrusion according to claim 3 wherein a deposit obtained by dispersing the polyimide precursor solution in the poor solvent is dried at 0° to 100° C. to regulate the good solvent content, thereby obtaining the composition comprising 30 to 45% by weight of the polyimide precursor (c), 0.1 to 5% by weight of the poor solvent and 35 to 69.9% by weight of the good solvent.

5. The process for preparing a polyimide precursor composition for extrusion according to claim 3 wherein the good solvent is a solvent containing 30% by weight or more of a component having a boiling point of 170° C. or more.

6. The process for preparing a polyimide precursor composition for extrusion according to claim 3 wherein in the reaction of the aromatic tetracarboxylic dianhydride or its derivative (a) with the aromatic diamine or its derivative (b) in the good solvent of the polyimide precursor, the concentration of a mixture of the components (a) and (b) is in the range of 10 to 20% by weight.

7. A process for preparing molded articles of a polyimide which comprises the steps of melting and extruding, at 50° to 100° C., a polyimide precursor composition for extrusion molding of polyimide comprising 30 to 45% by weight of (c) a polyimide precursor obtained by reacting (a) an aromatic tetracarboxylic dianhydride or its derivative with (b) an aromatic diamine or its derivative in a good solvent having a high solubility for the polyimide precursor and then depositing the resultant polyimide precursor (c) in a poor solvent having a low solubility for the polyimide precursor, 0.1 to 5% by weight of the poor solvent, and 35 to 69.9% by weight of the good solvent, and then heating the molded composition at 250° to 500° C. to imidate the same.

8. The process for preparing molded articles of a polyimide according to claim 7 which comprises melting a polyimide precursor composition for extrusion at 50° to 100° C., extruding the molten composition so as to coat through a coating die, with the molten composition, an outer surface of a core member successively fed, heating the composition at 250° to 500° C. to imidate it, and then removing the core member to obtain a tubularly molded article of the polyimide.

9. The process for preparing molded articles of a polyimide according to claim 7 wherein the good solvent is a solvent containing 30% by weight or more of a component having a boiling point of 170° C. or more.

10. The process for preparing molded articles of a polyimide according to claim 7 wherein in the reaction of the aromatic tetracarboxylic dianhydride or its derivative (a) with the aromatic diamine or its derivative (b) in the good solvent for the polyimide precursor, the concentration of a mixture of the components (a) and (b) is in the range of 10 to 20% by weight.

11. The process for preparing molded articles of a polyimide according to claim 7 wherein the melt index of the polyimide precursor composition for extrusion is in the range of 10 to 300 (g/10 min).

12. The process for preparing molded articles of a polyimide according to claim 7 wherein the extrusion is carried out by the use of a die to a land coated with a substance whose contact angle is 120° or less and which has a wet tension of 20 dyne/cm or less.

13. The process for preparing molded articles of a polyimide according to claim 7 wherein the polyimide precursor composition for extrusion is molten at 50° to 100° C., and then filtered through a screen pack having 300 mesh or more.

14. The process for preparing molded articles of a polyimide according to claim 8 wherein the melt index of the polyimide precursor composition for extrusion is in the range of 10 to 300 (g/10 min).

15. The process for preparing molded articles of a polyimide according to claim 8 wherein the extrusion is carried out by the use of a die to a land coated with a substance whose contact angle is 120° or less and which has a wet tension of 20 dyne/cm or less.

16. The process for preparing molded articles of a polyimide according to claim 8 wherein the polyimide precursor composition for extrusion is molten at 50° to 100° C., and then filtered through a screen pack having 300 mesh or more.

17. The polyimide precursor composition for extrusion according to claim 1 wherein the good solvent is a solvent containing at lest 30% by weight of a component having a normal boiling point of at least 170° C.

18. The polyimide precursor composition for extrusion according to claim 1 wherein the polyimide precursor composition for extrusion has a melt index of extrusion fluidity in the range between 10 to 300 g/10 min at 100° C.

19. The polyimide precursor composition for extrusion according to claim 1 wherein said polyimide precursor composition has the form of short fiber flakes or powder.

* * * * *